(12) United States Patent
Jeong

(10) Patent No.: US 7,707,691 B2
(45) Date of Patent: May 4, 2010

(54) HINGE ASSEMBLY FOR ELECTRONIC APPLIANCE AND STAND APPARATUS HAVING THE SAME

(75) Inventor: Deok Soo Jeong, Incheon (KR)

(73) Assignee: LG Electronics Inc., Seoul (KR)

( * ) Notice: Subject to any disclaimer, the term of this patent is extended or adjusted under 35 U.S.C. 154(b) by 296 days.

(21) Appl. No.: 11/802,702

(22) Filed: May 24, 2007

(65) Prior Publication Data

US 2008/0034551 A1 Feb. 14, 2008

(30) Foreign Application Priority Data

May 25, 2006 (KR) .............. 10-2006-0047194
Aug. 8, 2006 (KR) .............. 10-2006-0074782

(51) Int. Cl.
*E05D 3/10* (2006.01)

(52) U.S. Cl. .......................................... 16/367

(58) Field of Classification Search ............... 16/367, 16/338, 340, 250, 251; 248/222.51, 224.8, 248/222.41, 223.212, 917, 919, 922, 923, 248/22.12; 348/825; 361/679.06, 679.07, 361/679.12, 679.21
See application file for complete search history.

(56) References Cited

U.S. PATENT DOCUMENTS

| | | | | |
|---|---|---|---|---|
| 6,018,847 | A * | 2/2000 | Lu ............................. | 16/337 |
| 6,347,433 | B1 * | 2/2002 | Novin et al. ................ | 16/367 |
| 6,378,830 | B1 * | 4/2002 | Lu ............................. | 248/278.1 |
| 6,427,288 | B1 * | 8/2002 | Saito .......................... | 16/361 |
| 6,522,530 | B2 * | 2/2003 | Bang ........................ | 361/679.06 |
| 6,581,893 | B1 * | 6/2003 | Lu ............................. | 248/291.1 |
| 6,601,810 | B2 * | 8/2003 | Lee ........................... | 248/278.1 |
| 6,671,927 | B2 * | 1/2004 | Chen ......................... | 16/339 |
| 6,676,098 | B2 * | 1/2004 | Lin ............................ | 248/371 |
| 6,688,572 | B2 * | 2/2004 | Huang et al. .............. | 248/291.1 |
| 6,921,057 | B2 * | 7/2005 | Chen et al. ................ | 248/349.1 |
| 6,954,221 | B2 * | 10/2005 | Wu ......................... | 361/679.21 |
| 7,267,312 | B2 * | 9/2007 | Kang et al. .............. | 248/291.1 |
| 7,287,729 | B2 * | 10/2007 | Jung et al. ............... | 248/122.1 |
| 7,478,458 | B2 * | 1/2009 | Tajima ...................... | 16/367 |
| 2002/0053629 | A1 * | 5/2002 | Hokugoh ................... | 248/371 |
| 2004/0084578 | A1 * | 5/2004 | Cho et al. ................ | 248/125.1 |
| 2004/0118984 | A1 * | 6/2004 | Kim et al. ................ | 248/149 |
| 2005/0060843 | A1 * | 3/2005 | Hung ......................... | 16/367 |
| 2005/0108854 | A1 * | 5/2005 | Lee et al. .................. | 16/340 |
| 2006/0033847 | A1 * | 2/2006 | Kim ......................... | 348/836 |

FOREIGN PATENT DOCUMENTS

| | | |
|---|---|---|
| KR | 10-2003-0046900 A | 6/2003 |
| KR | 10-2004-0040000 A | 5/2004 |

* cited by examiner

*Primary Examiner*—Victor Batson
*Assistant Examiner*—Rowland D Do
(74) *Attorney, Agent, or Firm*—Birch, Stewart, Kolasch & Birch, LLP

(57) ABSTRACT

The present invention relates a hinge assembly for an electronic appliance and a stand apparatus having the same. The present invention comprises a hinge assembly for an electronic appliance including a bracket connected to a main body of the electronic appliance, a hinge housing connected to the bracket such that a tilt angle of the electronic appliance can be adjusted, and a supporting plate connected to the hinge housing such that a swivel angle of the electronic appliance can be adjusted. The present invention further comprises a hinge cover which covers the hinge assembly and includes a detachable portion for allowing the main body to be folded in parallel with the base plate.

10 Claims, 7 Drawing Sheets

HINGE ASSEMBLY FOR ELECTRONIC APPLIANCE AND STAND APPARATUS HAVING THE SAME

BACKGROUND OF THE INVENTION

1. Field of the Invention

The present invention relates to an electronic appliance, and more particularly, to a hinge assembly for an electronic appliance capable of adjusting a tilt angle and a swivel angle of the electronic appliance and a stand apparatus having the same.

2. Description of the Related Art

Generally, an electronic appliance such as a television or computer monitor is provided with a stand apparatus. The stand apparatus is connected to the electronic appliance to allow the electronic appliance to be supported on a ground or wall surface at various angles.

A hinge assembly capable of adjusting an angle of an electronic appliance is installed to the stand apparatus. The hinge assembly is connected to a main body of the electronic appliance, e.g., to a display unit of a monitor, to adjust a tilt angle of the display unit. At this time, the hinge assembly is provided with a bracket which in turn is connected to the main body of the electronic appliance. The hinge assembly is generally made of a synthetic resin material using a die casting process.

The hinge assembly is covered with a hinge cover. The hinge cover is fixed to a base plate supported on the ground surface or the like while covering the hinge assembly. The hinge cover shields a portion of the hinge assembly to beautify an external appearance of the electronic appliance.

However, there are the following problems in the aforementioned related art.

If the size of a liquid crystal display (LCD) is increased even though the LCD is small in size and light in weight as compared to a cathode-ray tube (CRT) display, e.g. if an LCD monitor or television has a size of at least 23 inches, the weight of the main body makes it difficult to implement a hinge assembly capable of adjusting both a tilt angle and a swivel angle of the LCD. In other words, the hinge assembly allows a user to relatively easily adjust the tilt angle of the main body. However, there is inconvenience in that the main body including the hinge assembly should be moved rightward or leftward as a whole in order to turn the LCD in a right and left direction.

Further, the die casting process used in manufacturing the hinge assembly has higher manufacturing costs and lower working efficiency as compared to a pressing process. In addition, the strength of the hinge assembly manufactured by the die casting process is lower than that of the hinge assembly manufactured by the pressing process.

In addition, the packaging volume should be generally minimized for transportation convenience of economic efficiency when the electronic appliance is packaged and transported. However, the hinge assembly cannot be folded by an angle no less than a predetermined angle due to the presence of the hinge cover. That is, if the main body is pushed backward by an angle no less than the predetermined angle, one side of the bracket comes into contact with an upper end of the hinge cover and thus the main body cannot be folded any more. Accordingly, there is a problem in that the packaging volume of the electronic appliance is also increased.

SUMMARY OF THE INVENTION

According to an aspect of the present invention for solving the aforementioned problems in the related art, there is provided a hinge assembly for an electronic appliance, which comprises a bracket connected to a main body of the electronic appliance; a hinge housing connected to the bracket such that a tilt angle of the electronic appliance can be adjusted; and a supporting plate connected to the hinge housing such that a swivel angle of the electronic appliance can be adjusted. At this time, the bracket, the hinge housing and the supporting plate may be formed of a metallic material by a pressing process.

The bracket may include a rear portion with a plurality of fastening holes for connecting the bracket to the main body, and side portions each of which has a width increased as it goes downward. In such a case, a first floor portion bent perpendicularly and inwardly from a lower end of a rear portion of the hinge housing may support bottom surfaces of second floor portions bent perpendicularly and inwardly from lower ends of side portions of the hinge housing.

The side portions of the bracket and the side portions of the hinge housing may be formed with fastening holes, respectively, which correspond to each other and are connected to each other by first shafts such that the tilt angle can be adjusted.

The first floor portion of the hinge housing and the supporting plate may be formed with holes for rotation, respectively, which correspond to each other and are connected to each other by a second shaft such that the swivel angle can be adjusted.

Further, one side of the hinge housing and one side of the supporting plate may be provided with stoppers for limiting the tilt angle and the swivel angle, respectively.

The bracket may be provided with an elastic member for applying an elastic force to the bracket in a direction in which the bracket stands upright with respect to the supporting plate, whereby it is possible to prevent the bracket from being abruptly rotated due to weight of the main body.

Each of the elastic members may be a torsion spring of which one end is fixed to the bracket and the other end is fixed to the hinge housing to apply the elastic force to the bracket in a direction in which the bracket stands upright with respect to the supporting plate.

According to another aspect of the present invention, there is provided a stand apparatus for an electronic appliance, which comprises a base plate; a hinge assembly placed on and fixed to the base plate and connected to a main body of the electronic appliance such that an tilt angle and a swivel angle of the electronic appliance can be adjusted; and a hinge cover placed on the base plate to cover the hinge assembly and having a detachable portion for allowing the main body to be folded in parallel with the base plate.

At this time, the hinge assembly may include a bracket connected to the main body of the electronic appliance, a hinge housing connected to the bracket such that the tilt angle can be adjusted, and a supporting plate connected to the hinge housing such that the swivel angle can be adjusted.

The hinge cover may include a coupling portion placed on and coupled with the base plate and a shielding portion extending upward from the coupling portion to cover the hinge assembly. At this time, the detachable portion for allowing the main body to be folded in parallel with the base plate is selectively coupled with the shielding portion.

The detachable portion and the shielding portion may be provided with a fastening hook and a fastening protrusion at positions corresponding to each other, respectively, to thereby allow the detachable portion and the shielding portion to be selectively coupled with each other. Further, the detachable portion may be provided with a plurality of inwardly protruding projections, and a plurality of supports brought into contact with the protrusions to support the detachable portion are formed on a top surface of the coupling portion.

Preferably, a lower surface of the detachable portion is provided with a stepped surface and the top surface of the coupling portion is provided with a stepped line corresponding to the stepped surface, so that the lower surface of the detachable portion is installed to the top surface of the coupling portion along the stepped line.

The detachable portion may be formed with a cable hole through which a cable connected to the main body passes, and a bottom surface of the base plate may be provided with a support plate made of a metallic material.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE PREFERRED EMBODIMENTS

Figure 1:
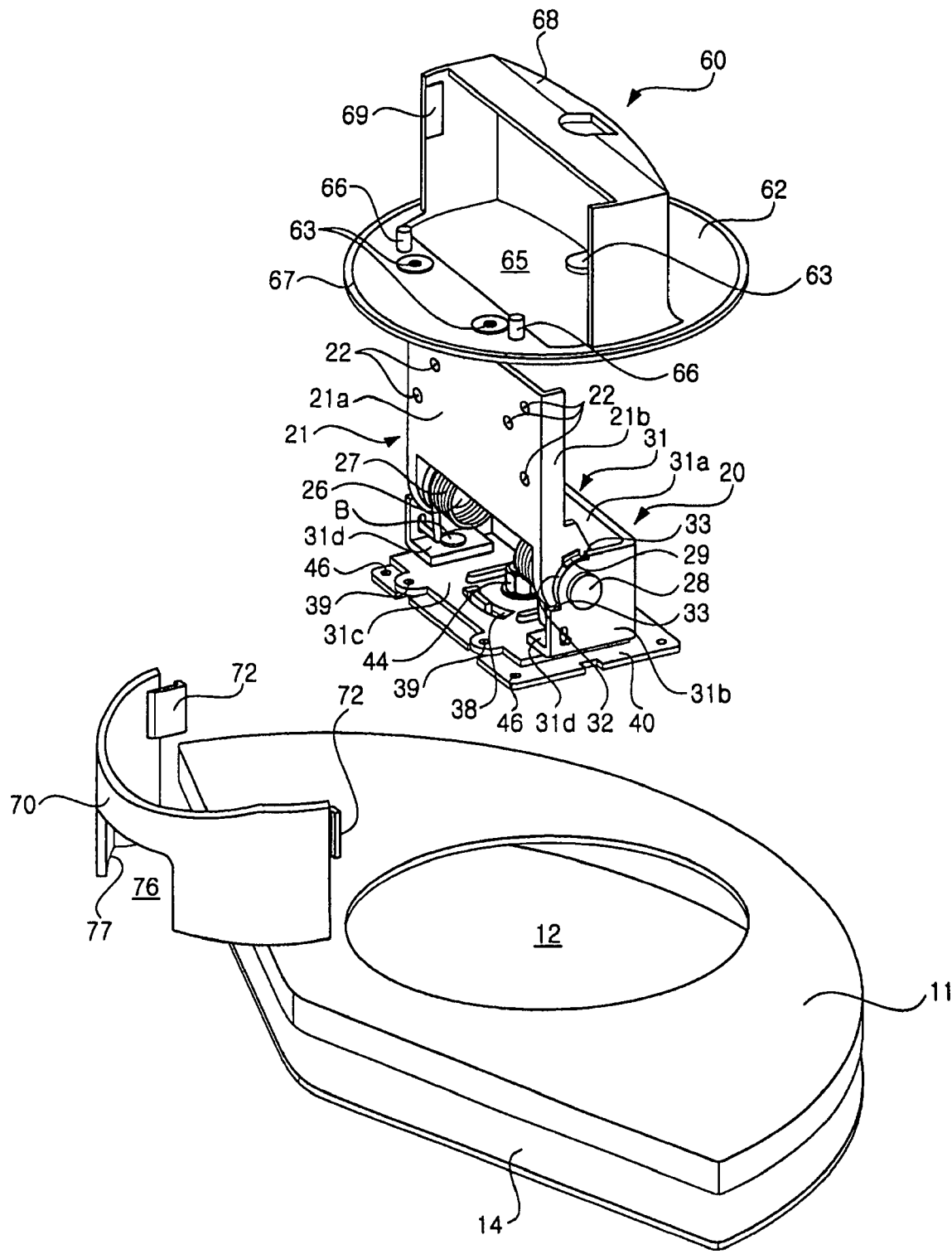
FIG. 1 is an exploded perspective view illustrating a preferred embodiment of a stand apparatus for an electronic appliance according to the present invention.

Referring to the figures, a base plate 11 defines the external appearance of and forms the framework of a stand apparatus. The base plate 11 is generally made of a synthetic resin material. At this time, it is preferred that the base plate 11 be formed to have the lower height relative to the upper and lower surface areas such that a combined structure of a main body 10 of an electronic appliance (see FIG. 7) and a hinge assembly 20 to be described later can be stably supported on the base plate 11.

A top surface of the base plate 11 is provided with a seating portion 12 which is opened. The seating portion 12 is formed to correspond to a hinge cover 60 to be described later and is coupled with the hinge cover 60. In this embodiment, the seating portion 12 is shaped as a circle but the present invention is not limited thereto. That is, the seating portion 12 may be formed into various shapes.

Then, a support plate 14 is coupled to a bottom surface of the base plate 11. The support plate 14 is made of a rigid metallic material using the pressing process. Thus, even when the electronic appliance is heavy, the electronic appliance can be supported by the support plate 14 positioned on the bottom surface of the base plate 11. Preferably, the base plate 11 and the support plate 14 are fastened to each other with screws such that they can be firmly coupled to each other. Although it has not been shown in the figures, the support plate 14 is formed with fastening holes corresponding to screw fastening holes 46 to be described later such that the support plate 14 and the hinge assembly 20 can be coupled with each other.

The hinge assembly 20 is securely placed on the top surface of the base plate 11. The hinge assembly 20 serves to adjust the tilt angle or swivel angle of the main body 10 of the electronic appliance. The hinge assembly 20 is made of a metallic material.

The hinge assembly 20 is provided with a bracket 21 which is connected to the main body 10. The bracket 21 has a plate structure preferably made of a metallic material. The bracket 21 is composed of a rear portion 21a mounted to a rear surface of the main body 10, and side portions 21b formed perpendicularly at both ends of the rear portion 21a. The side portion 21b is inserted into a corresponding groove (not shown) which is formed in the main body 10. Accordingly, as compared to a case where the main body 10 and the rear portion 21a are fastened to each other by merely using fasteners such as screws, a right-to-left motion of the main body 10 can be further prevented and the load concentrated on the fasteners can also be distributed, so that more stable coupling can be achieved. At this time, the bracket 21 is formed with a plurality of fastening holes 22 such that it can be fastened to the main body 10 with screws.

Each of the side portions 21b is formed wider as it goes downward, and a fastening hole 25 is formed at a lower position thereof. A first shaft 28 for adjusting a tilt angle of the hinge assembly 20 penetrates through the fastening hole 25 to connect the bracket 21 and a hinge housing 31 with each other.

The fastening hole 25 is provided with a cylindrical spring guide 26 around which an elastic member 27 is inserted and guided. The spring guides 26 are formed to extend from opposite surfaces of the side portions 21b of the bracket 21. Each of the spring guides 26 is formed hollow such that the first shaft 28 can be inserted into the spring guide 26.

Figure 3:
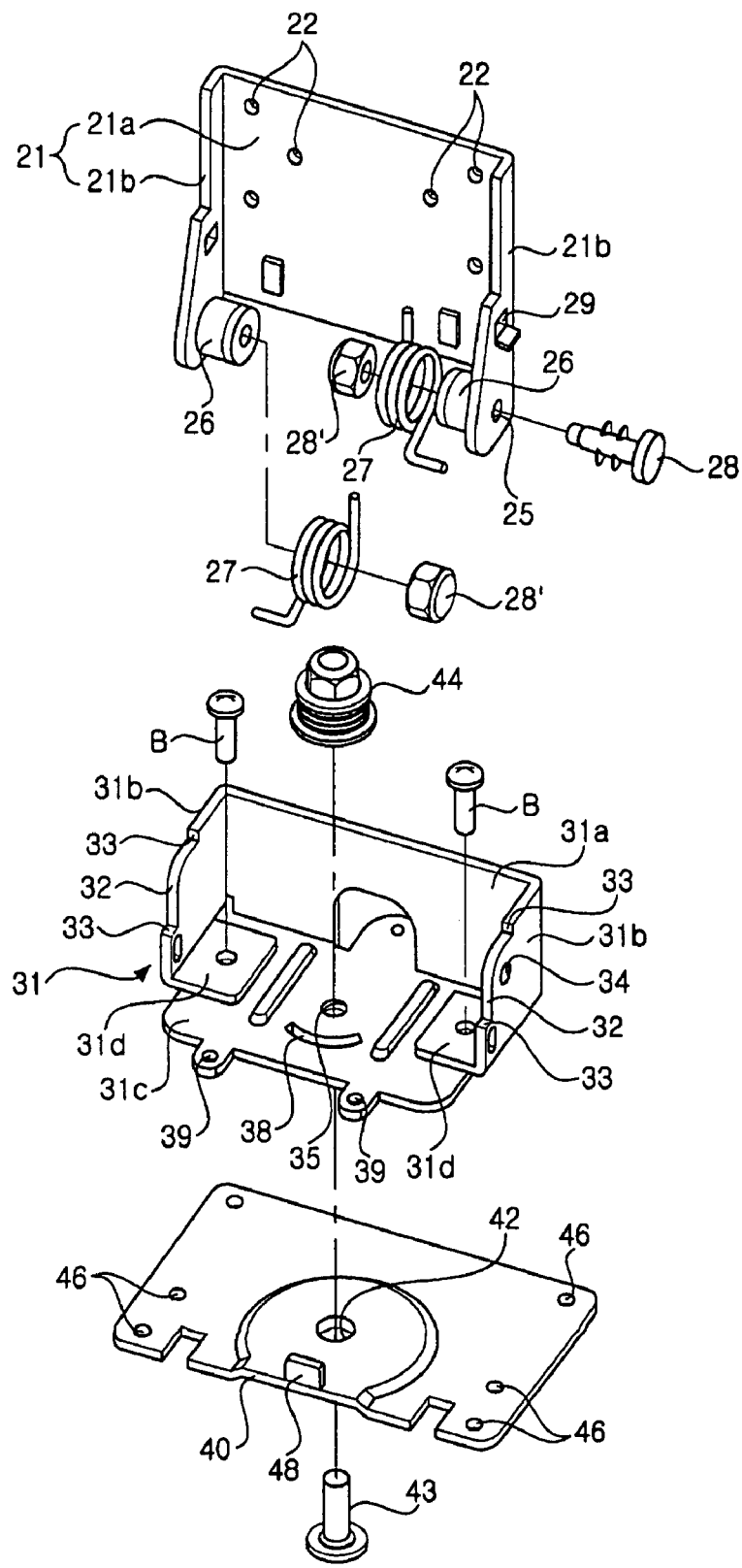
FIG. 3 is an exploded perspective view illustrating a preferred embodiment of a hinge assembly for an electronic appliance according to the present invention.

Each of the elastic members 27 is inserted around the first shaft 28. At this time, as shown in FIG. 3, the hollow spring guide 26 may be additionally provided to guide the elastic member 27. Since the center of gravity of the main body 10 is moved forward as the main body is tilted, the elastic member 27 serves to prevent forces necessary to cause the main body 10 to be tilted forward and backward from being different from each other when the tilt angle is adjusted. Preferably, the elastic member 27 is a torsion spring whose one end is fixed to the bracket 21 and the other end is fixed to the hinge housing 31.

The first shaft 28 is inserted into the fastening hole 25. The first shaft 28 penetrates through the fastening hole 25 and is coupled with a fixing nut 28'. The first shaft 28 functions as a kind of tilting axis such that the tilt angle can be adjusted in a state where the bracket 21 is connected to the hinge housing 31.

An external surface of the side portion 21*b* of the bracket 21 is provided with an outwardly protruding stopper 29. The stopper 29 is guided along a rounded portion 32 as will be described later, and is caught to a catching protrusion 33 formed at both ends of the rounded portion 32 to prevent the bracket 21 from being further tilted. That is, by means of the stoppers 29 and the catching protrusions 33, the bracket 21 can be rotated to a position parallel with the base plate (see FIG. 7). Accordingly, the electronic appliance can be packaged and transported in a state where the bracket 21 is pushed backward in parallel with the base plate 11.

The hinge housing 31 is formed into a plate shape and is made of a metallic material. Further, the hinge housing 31 is connected to the bracket 21. Preferably, the hinge housing 31 is formed to cover the bracket 21, but the present invention is not limited thereto. For example, the bracket 21 may be connected externally to the hinge housing 31.

Each of side portions 31*b* of the hinge housing 31 may be bent perpendicularly from a rear portion 31*a* of the hinge housing 31. The side portion 31*b* is formed with a fastening hole 34 in which the first shaft 28 is fixed and with which the fastening hole 25 of the bracket 21 is coaxially aligned. That is, the first shaft 28 allows the bracket 21 to be rotated with respect to the hinge housing 31. At this time, it is preferable that the first shaft 28 formed with a threaded portion at an end thereof is fastened with the fixing nut 28' such that the bracket 21 and the hinge housing 31 can be firmly coupled with each other. Accordingly, there exists a friction force between the bracket 21 and the hinge housing 31 so that the bracket 21 cannot be rotated arbitrarily by the weight of the main body 10.

The hinge housing 31 has a dual floor structure in which bottom surfaces of second floor portions 31*d* bent perpendicularly at and inwardly from lower ends of the side portions 31*a* of the hinge housing 31 are supported by a first floor portion 31*c* bent perpendicularly at and inwardly from a lower end of the rear portion 31*a* of the hinge housing 31. Such a dual floor structure can withstand heavy load applied by the large main body 10. Further, the first and second floor portions 31*c* and 31*d* are fastened to each other with fasteners B such that they can be firmly fixed to each other.

The rounded portion 32 is formed at a corner of the side portion 31*b*. The rounded portion 32 guides the relevant stopper 29 such that the bracket 21 can be rotated with respect to the hinge housing 31. At this time, both ends of the rounded portion 32 are provided with the catching protrusions 33, respectively. The stopper 29 is caught to each of the catching protrusions 33 to prevent the bracket 21 from being further rotated. Accordingly, the bracket 21 is rotated within a predetermined range, preferably, to a degree where the bracket 21 can be in parallel with the base plate 11.

At this time, the hinge housing 31 is formed into a box type with an open top and front. Here, the first floor portion 31*c* defining the floor surface of the hinge housing 31 is formed with a hole for rotation 35 through which a second shaft 43 penetrates together with a hole for rotation 42 (which will be explained later) formed in a supporting plate 40 such that the hinge housing 31 and the supporting plate 40 are connected to each other. Accordingly, the hole for rotation 35 allows the main body 10 to be swiveled together with the second shaft 43.

The first floor portion 31*c* is formed with a guide slot 38. The guide slot 38 is formed into an arc shape and a housing stopper 48 formed on the supporting plate 40 is placed. The guide slot 38 limits a moving range of the housing stopper 48 and thus limits a swiveling range of the hinge housing 31 with respect to the supporting plate 40.

Figure 2:
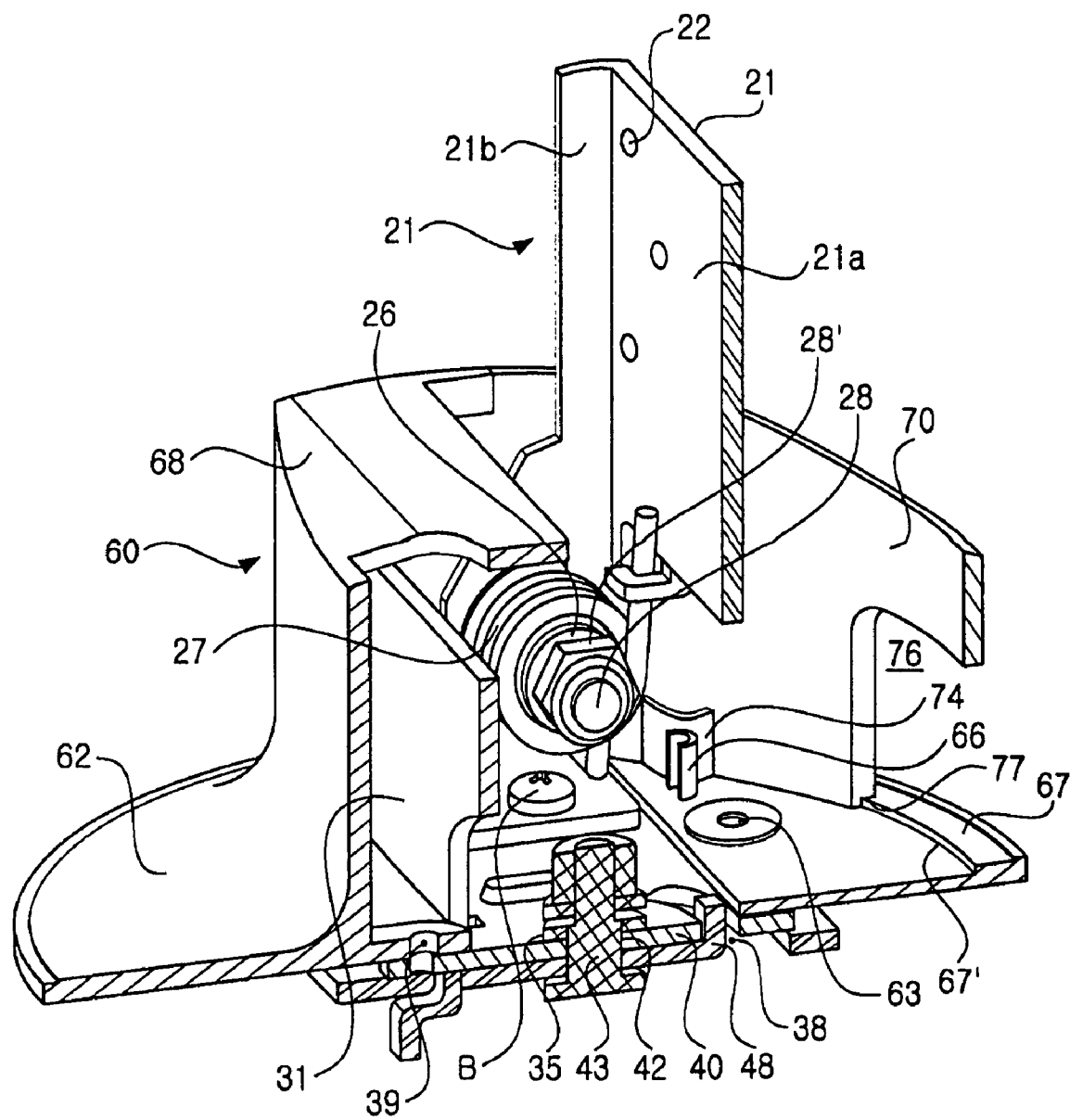
FIG. 2 is a sectional perspective view illustrating the interior configuration of the stand apparatus for the electronic appliance according to the embodiment of the present invention.

Further, the first floor portion 31*c* is formed with a plurality of fastening holes 39. Each of the fastening holes 39 is fastened with a screw to a fastening hole 63 formed in a coupling portion 62 of the hinge cover 60 to be described later, so that the hinge assembly 20 and the hinge cover 60 can be coupled to each other. Preferably, as shown in FIG. 2, a plurality of the fastening holes 39 are formed in outwardly protruding portions of the first floor portion 31*c*, so that the hinge cover 60 and the first floor portion 31*c* can be firmly coupled to each other.

The supporting plate 40 is coupled to a bottom surface of the hinge housing 31. The supporting plate 40 is formed into a plate shape and is made of a metallic material. The hoe for rotation 42 is formed at the center of the supporting plate 40. The hole for rotation 42 corresponds to the hole for rotation 35 of the hinge housing 31, and the second shaft 43 penetrates through the holes for rotation 35 and 42 to connect the hinge housing and the supporting plate with each other.

The second shaft 43 penetrates through the hole for rotation 35 of the hinge housing 31 and the hole for rotation 42 of the supporting plate 40 and is then fastened to a fixing nut 44. The second shaft 43 functions as a kind of rotation axis which allows the hinge housing 31 to be moved with respect to the supporting plate 40. In other words, the hinge housing 31 and the bracket 21, which are coupled with each other, is rotated with respect to the supporting plate 40 by means of the second shaft 43, so that the swivel angle of the main body 10 can be adjusted.

Corner portions of the supporting plate 40 are formed with the screw fastening holes 46. The screw fastening holes 46 are formed to correspond to the screw fastening holes in the support plate 14, so that the hinge assembly 20 can be fastened to the support plate 14.

The supporting plate 40 is formed with the protruding housing stopper 48 at positions corresponding to the guide slot 38. The housing stopper 48 is positioned within the guide slot 38, and thus, the moving range of the housing stopper 48 can be limited by the guide slot 38. Accordingly, the swiveling range of the hinge housing 31 with respect to the supporting plate 40 can also be limited.

The hinge cover 60 is securely placed on the top surface of the base plate 11. The hinge cover 60 covers the hinge assembly 20 to shield the hinge assembly 20 from the outside, thereby beautifying an external appearance of the electronic appliance. The hinge cover 60 is generally made of a synthetic resin material.

A floor surface of the hinge cover 60 is provided with the coupling portion 62 which is coupled with the base plate 11. The coupling portion 62 is formed to correspond to the seating portion 12 of the base plate 11 and is securely placed on the base plate 11. Preferably, the coupling portion 62 is formed with the fastening holes 63 corresponding to the fastening holes 39 formed in the first floor portion 31*c* of the hinge housing 31. Accordingly, the hinge cover 60 is securely placed on the base plate 11 in a state where it is coupled with the hinge assembly 20.

Further, the floor surface of the hinge cover 60 is formed with an interference prevention portion 65. The interference prevention portion 65 is an open portion through which the hinge cover 60 can be inserted into the hinge assembly 20 from above.

The coupling portion 62 is formed with supports 66 for supporting a detachable portion 70 to be described later. The supports 66 are formed to protrude from a top surface of the coupling portion 62 and come into contact with projections 74 formed on the detachable portion 70. As shown in FIG. 2, the supports 66 cause a lower end of the detachable portion 70 to be placed between the supports 66 and a stepped line 67' to be described later, so that the detachable portion 70 can be installed at a correct position. Preferably, at least two supports 66 are formed to be symmetrically placed such that the detachable portion 70 can be stably coupled with the coupling portion 62.

The top surface of the coupling portion 62 is formed a stepped surface 67. The stepped surface 67 is formed in a stepped manner with respect to the coupling portion 62 along an outer periphery of the coupling portion 62. At this time, the lower end of the detachable portion 70 is securely placed on the stepped line 67' formed by the stepped surface 67. Accordingly, the lower end of the detachable portion 70 is placed between the stepped line 67' and the supports 66. The stepped line 67' prevents the detachable portion 70 from being separated and induces the detachable portion 70 to be securely placed at the correct position on the top surface of the coupling portion 62.

A shielding portion 68 is formed to extend vertically from the coupling portion 62. Since the shielding portion 68 covers the hinge assembly 20 to shield the hinge assembly 20 from the outside. Preferably, the shielding portion 68 is integrally formed with the coupling portion 62, and a portion connected to the coupling portion 62 and a side portion are formed to have a smooth curved surface, so that the external appearance of the electronic appliance can be beautified.

At this time, the shielding portion 68 is formed to have an open side such that the detachable portion 70 can be coupled with the shielding portion 68. Accordingly, when the electronic appliance is packaged and transported, the detachable portion 70 is separated and the bracket 21 is then completely folded backward through the open side of the shielding portion, thereby minimizing the packaging volume. Of course, the detachable portion 70 may coupled again with the shielding portion 68 when intending to utilize the electronic appliance.

Fastening protrusions 69 are formed at both ends of the shielding portion 68, respectively. The fastening protrusions 69 are coupled with fastening hooks 72 formed on the detachable portion 70 to couple the shielding portion 68 and the detachable portion 70 with each other.

The detachable portion 70 is coupled to the shielding portion 68. The detachable portion 70 is coupled to the shielding portion 68 to thereby shield the hinge assembly 20 from the outside. The detachable portion 70 is made of the same synthetic resin material as the hinge cover 60. As well shown in FIG. 1, the detachable portion 70 is curved and coupled with the shielding portion 68 to define a continuous curved surface, so that the external appearance of the electronic appliance can be beautified.

Both ends of the detachable portion 70 are formed with the fastening hooks 72, respectively. The fastening hooks 72 are fastened to the fastening protrusions 69 to thereby couple the shielding portion 68 and the detachable portion 70 with each other. Preferably, the fastening hooks 72 are formed to protrude from both ends on an inner surface of the detachable portion 70, so that the side surfaces of the detachable portion 70 and the shielding portion 68 can be formed into a continuous surface without steps when the detachable portion 70 is coupled with the shielding portion 68.

As shown in FIG. 2, the projections 74 are formed within the detachable portion 70. Each of the projections 74 is formed at the lower end of the detachable portion 70 and comes into contact with the support 66. That is, while the detachable portion 70 is installed on the coupling portion 62, the projections 74 induce the lower end of the detachable portion 70 to be placed between the stepped line 67' and the supports 66 and allow the detachable portion 70 to be kept at the correct position after the detachable portion 70 has been installed to the coupling portion 62. At this time, at least two projections 74 are preferably formed in a symmetrical way to correspond to the supports 66.

A cable opening 76 is formed in one side of the detachable portion 70. The cable opening 76 is used to connect a cable (not shown) extending from the main body 10 to the rear of the electronic appliance without interfering with the detachable portion 70.

Hereinafter, the operation of the stand apparatus for an electronic appliance according to the present invention so configured will be described in detail.

Figure 4A:
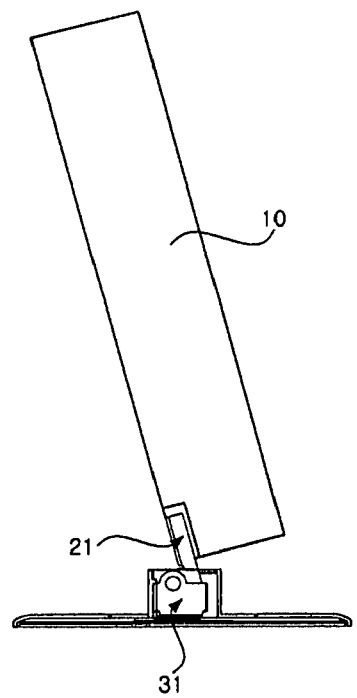
FIGS. 4a and 4b are views illustrating an operating state where a tilt angle of a main body is adjusted by the hinge assembly according to the embodiment of the present invention.
Figure 4B:
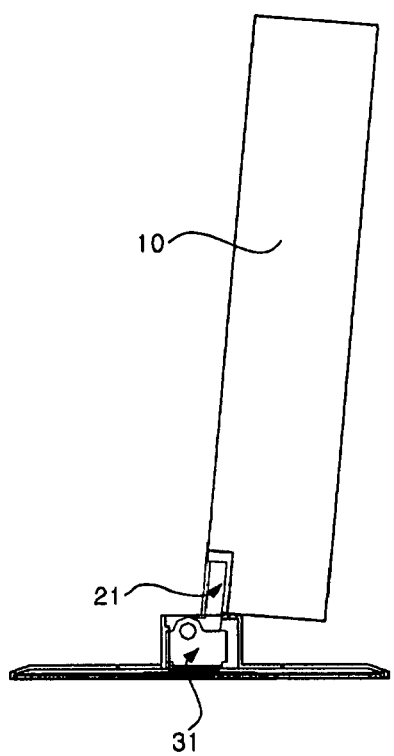

First, a process of adjusting the tilt angle of the main body by the hinge assembly will be explained with reference to FIGS. 4a and 4b.

First of all, a process of allowing the main body 10 to be pushed backward at a predetermined angle will be discussed. To this end, a user applies a predetermined force directly to the main body 10 to push backward an upper portion of the main body 10. As a result, the main body 10 and the bracket 21 connected to the main body 10 are rotated to be tilted with respect to the supporting plate 40 backward from a front end of the supporting plate 40. That is, the main body 10 and the bracket 21 are rotated about the first shafts 28 with respect to the supporting plate 40.

At this time, forces necessary to tilt the main body 10 forward and rearward are equal to each other due to the elastic members 27. Further, the frictional force exerted between the bracket 21 and the hinge housing 31 allows the main body 10 to be halted at such a tilted state even though the exerted force is removed.

Of course, if a force is applied to the main body 10 in a reverse direction to pull the main body 10 forward, the main body 10 can be tilted forward by a predetermined angle.

Figure 5:
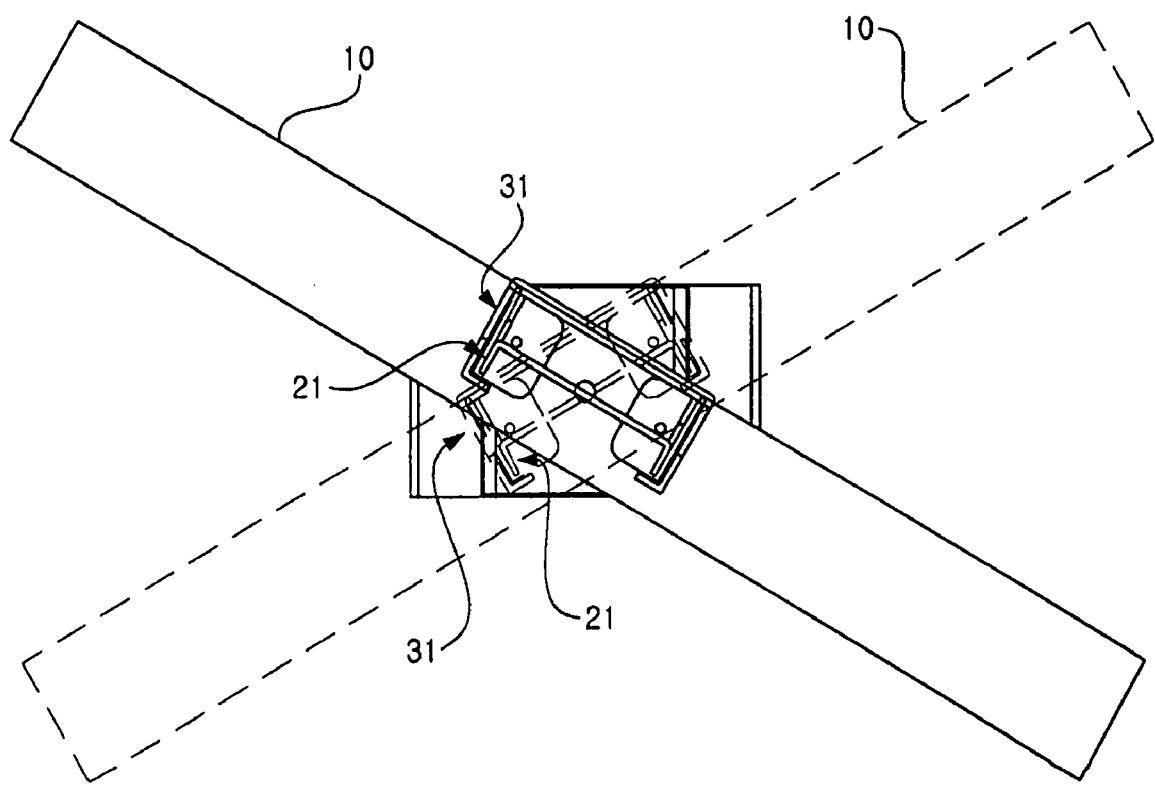
FIG. 5 is a view illustrating an operating state where a swivel angle of the main body is adjusted by the hinge assembly according to the embodiment of the present invention.
Figure 6:
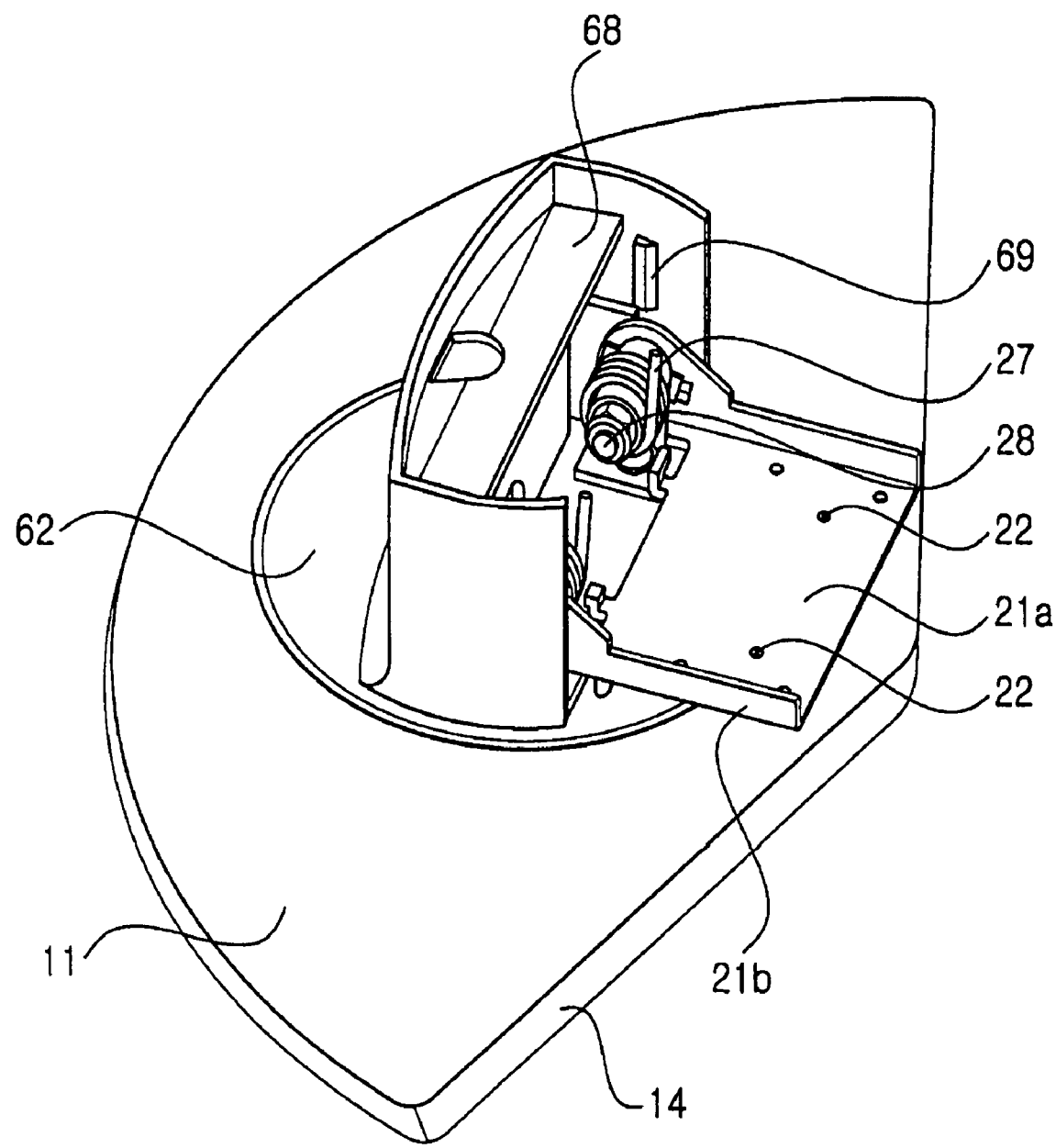
FIG. 6 is a view illustrating an operating state where the tilt angle of the main body is adjusted in a state where a detachable portion of a hinge cover of the present invention is detached.

Next, a process of swiveling the main body 10 by a predetermined angle will be explained with reference to FIG. 5.

To this end, a user first applies a predetermined force to the main body 10 to push backward the right or left portion of the main body 10. As a result, the main body 10 and the bracket 21 and hinge housing 31 connected to the main body 10 are rotated rightward or leftward (i.e., swiveled) with respect to the supporting plate 40. That is, the main body 10, the bracket 21 and the hinge housing 31 are rotated about the second shaft 43 with respect to the supporting plate 40.

At this time, the frictional force exerted between the hinge housing 31 and the supporting plate 40 allows the main body 10 to be halted at such a rotated state even though the exerted force is removed. Alternatively, a force may be applied to the other portion of the main body 10 to rotate the main body 10 in a reverse direction.

Next, a process of assembling the stand apparatus for an electronic appliance will be described. First of all, the hinge cover 60 is coupled to the hinge assembly 20 in a state where the detachable portion 70 has not yet been coupled to the hinge cover 60. That is, the hinge cover 60 is coupled with the hinge assembly 20 as if the hinge cover 60 covers the hinge assembly 20 from above the hinge assembly 20 through the interference prevention portion 65. At this time, the fastening holes 39 formed in the first floor portion 31c of the hinge housing 31 and the fastening holes 63 formed in the coupling portion 62 are fastened to each other with screws, so that the hinge cover 60 and the hinge assembly 20 can be firmly coupled with each other.

Then, in a state where a combined structure of the hinge assembly 20 and the hinge cover 60 is securely placed on the seating portion 12 of the base plate 11, the combined structure and the base plate 11 are fastened to each other. At this time, in a state where the base plate 11 and the support plate 14 are coupled with each other, the combined structure of the hinge assembly 20 and the hinge cover 60 is coupled with a combined structure of the base plate 11 and the support plate 14 by tightening screws through the screw fastening holes (not shown) of the support plate 14 and the screw fastening holes 46 formed in the supporting plate 40.

The main body 10 is coupled to the stand apparatus for an electronic appliance assembled as described above. That is, the main body 10 is connected and fixed to the stand apparatus by tightening screws through the fastening holes 22 formed in the bracket 21 and the fastening holes (not shown) formed in the main body 10.

Figure 7:
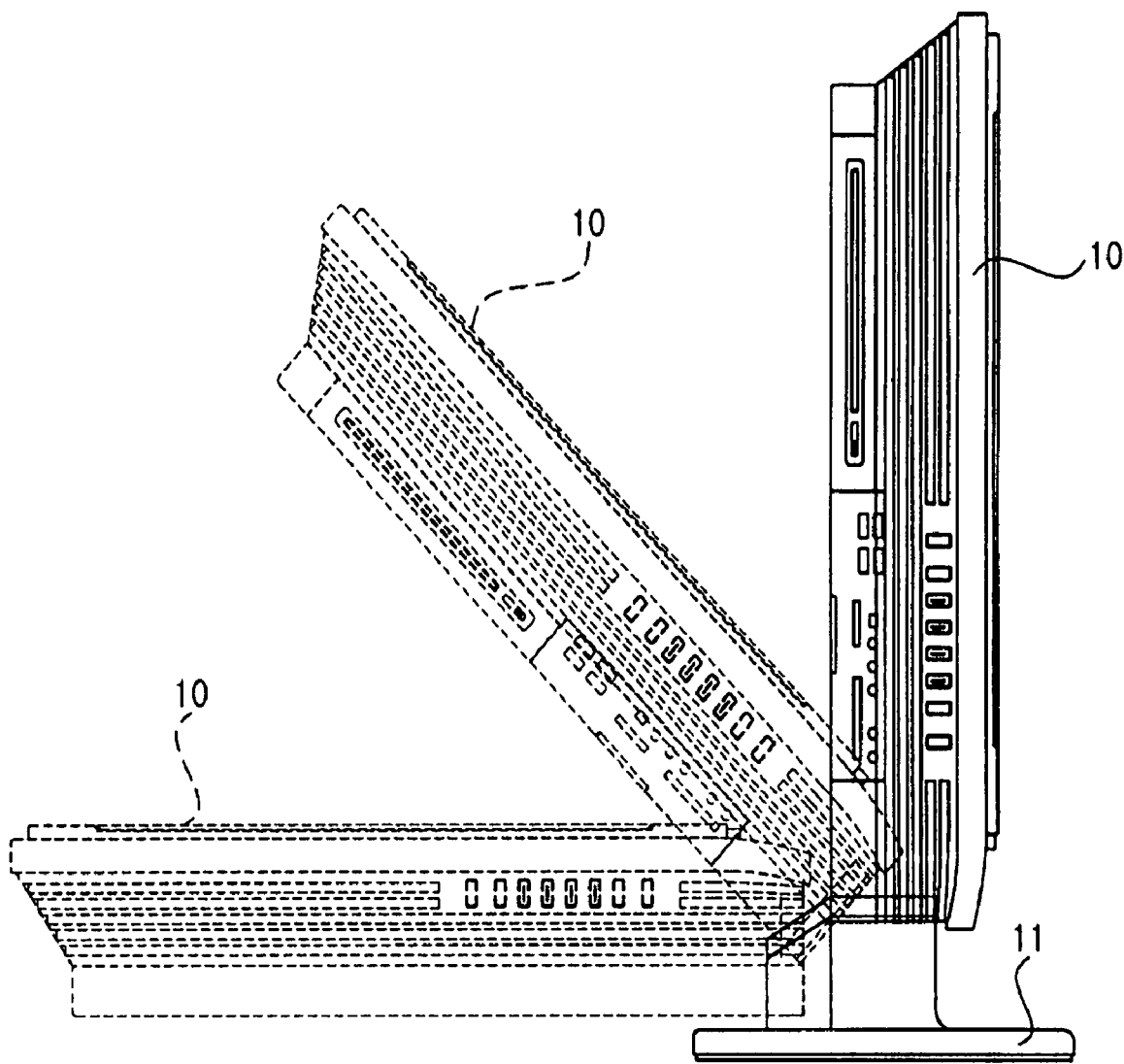
FIG. 7 is a perspective view illustrating a state where a bracket of the hinge assembly is completely pushed backward in a state where the detachable portion of the hinge cover of the present invention is detached.

FIG. 7 shows an operating state illustrating a process of folding backward the main body 10 according to the embodiment of the present invention. Referring to the figure, when the electronic appliance is packaged and transported, a worker pushes backward the main body 10 such that the bracket 21 can be folded in parallel with the base plate 11 as shown FIG. 4. As a result, the total packaging volume of the electronic appliance can be greatly reduced, and thus, even a large number of electronic appliances can also be transported at one time.

Finally, if the electronic appliance is transferred to a user, the user pulls the main body 10 forward and then causes the detachable portion 70 to be coupled with the hinge cover 60. To this end, the user causes the lower end of the detachable portion 70 to be positioned between the supports 66 and the stepped line 67', which are formed on the top surface of the coupling portion 62, and the user then urges the fastening hooks 72 formed on the detachable portion 70 into the fastening protrusion 69 while overcoming a certain elastic force. At this time, the cable connected from the main body 10 extends through the cable hole 76 rearward.

Further, the user can adjust the tilt angle or swivel angle of the main body 10 to obtain a desired viewing angle using the method as described above if necessary.

According to the stand apparatus for an electronic appliance of the present invention so configured, the following advantageous effects can be obtained.

First, the hinge assembly is formed of a metallic material by a pressing process and the two shafts are employed. Further, the hinge housing has a dual floor structure, and the bracket is coupled with the main body in such a manner that the side portion of the bracket is inserted into the groove formed in the rear surface of the main body. Thus, the stand apparatus can support even a heavy electronic appliance, and the swivel angle as well as the tilt angle can also be easily adjusted by means of the hinge assembly. Accordingly, the present invention can be applied to a large electronic appliance according to the recent tendency in that the size of the electronic appliance has been increased. Further, since the electronic appliance can be easily pivoted with respect to the base plate, the electronic appliance can be adjusted to a variety of working states.

Further, since the hinge assembly is manufactured by not the die casting process but the pressing process, there is an advantage in that the operating speed can be relatively faster and the manufacturing costs can also be reduced.

In addition, a portion of the hinge cover covering the hinge assembly of the electronic appliance is configured to be detachable. Also, the bracket of the hinge assembly can be folded backward through a space defined by the detachable portion of the hinge cover. As a result, the main body of the electronic appliance which is coupled with the bracket, e.g. a display unit for a monitor, can be folded in parallel with the base plate.

Since the electronic appliance is packaged and transported in such a state, the total packaging volume of the electronic appliance can be greatly reduced. Accordingly, since much greater number of electronic appliances can be packaged and transported, the packaging and transportation costs can be reduced.

The present invention is not limited to the embodiments as described above but defined as stated in the claims. Although the preferred embodiment of the present invention has been disclosed for illustrative purposes, those skilled in the art will appreciate that various modifications, additions and substitutions are possible, without departing from the scope and spirit of the invention as defined in the appended claims.

What is claimed is:

1. A hinge assembly for an electronic appliance, comprising:
    a bracket;
    a hinge housing pivotally connected to the bracket such that a tilt angle of the electronic appliance can be adjusted about a first axis; and
    a supporting plate pivotally connected to the hinge housing such that a swivel angle of the electronic appliance can be adjusted about a second axis perpendicular to the first axis;
    the bracket including a rear portion with a plurality of fastening holes for connecting the bracket to the main body; and
    bracket side portions, each bracket side portion being perpendicular to said rear portion and having an increasing width as it goes from one end to another end;
    said hinge housing including: a first floor portion; bent perpendicularly and inwardly from a lower end of a rear portion of the hinge housing; side portions bent perpendicularly and inwardly from sides of the hinge housing; and
    second floor portions bent perpendicularly and inwardly from lower ends of the side portions of the hinge housing;
    a first stopper on the bracket for limiting the tilt angle; and
    a second stopper on the supporting plate to limit the swivel angle.

2. The hinge assembly as claimed in claim 1, wherein the bracket, the hinge housing and the supporting plate are formed of a metallic material by a pressing process.

3. The hinge assembly as claimed in claim 1, wherein the side portions of the bracket and the side portions of the hinge housing are provided with fastening holes, respectively, which correspond to each other and are connected to each other by first shafts such that the tilt angle can be adjusted.

4. The hinge assembly as claimed in claim 1, wherein the first stopper comprises an outwardly protruding stopper on each of the side portions of the bracket, each of the side portions of the hinge housing is provided with a rounded portion for guiding the outwardly protruding stopper, and both ends of the rounded portion are provided with catching protrusions to limit a rotating range of the outwardly protruding stopper.

5. The hinge assembly as claimed in claim 1, wherein the first floor portion of the hinge housing and the supporting plate are provided with a guide slot and a housing stopper, respectively, which correspond to each other to limit a rotating range of the hinge housing.

6. The hinge assembly as claimed in claim 1, wherein the bracket is provided with an elastic member for applying an elastic force to the bracket in a direction in which the bracket stands upright with respect to the supporting plate.

7. The hinge assembly as claimed in claim 3, wherein the first floor portion of the hinge housing and the supporting plate are provided with holes for rotation, respectively, which correspond to each other and are connected to each other by a second shaft such that the swivel angle can be adjusted.

8. The hinge assembly as claimed in claim 6, wherein the elastic member is inserted around and fixed to a hollow cylindrical spring guide extending from the side portion of the bracket in a direction facing toward the opposite side portion.

9. The hinge assembly as claimed in claim 8, wherein first shafts penetrates through the hollow cylindrical spring guide and through the hinge housing and are fastened with a fixing nut.

10. The hinge assembly as claimed in claim 9, wherein each of the elastic members is a torsion spring of which one end is fixed to the bracket and the other end is fixed to the hinge housing to apply the elastic force to the bracket in a direction in which the bracket stands upright with respect to the supporting plate.

* * * * *